United States Patent [19]

Salt et al.

[11] Patent Number: 4,767,267

[45] Date of Patent: Aug. 30, 1988

[54] SEAL ASSEMBLY

[75] Inventors: Jonathan G. L. Salt; Ronald W. Korzun, both of Beverly; David R. Abbott, Manchester, all of Mass.

[73] Assignee: General Electric Company, Lynn, Mass.

[21] Appl. No.: 937,634

[22] Filed: Dec. 3, 1986

[51] Int. Cl.[4] ............................................. F01D 11/02
[52] U.S. Cl. ................................ 415/174; 415/170 R
[58] Field of Search ............... 415/171, 174, 170 R, 415/136, 137

[56] References Cited

U.S. PATENT DOCUMENTS

| | | | |
|---|---|---|---|
| 3,018,085 | 1/1962 | Welsh | 415/174 |
| 3,046,648 | 7/1962 | Kelly | 29/455 |
| 3,079,128 | 2/1963 | Burge | 415/174 |
| 3,343,806 | 9/1967 | Bobo et al. | 415/174 |
| 3,365,173 | 1/1968 | Lynch et al. | 415/218 |
| 3,423,070 | 1/1969 | Corrigan | 415/200 |
| 3,558,237 | 1/1971 | Wall, Jr. | 415/172 A |
| 3,603,599 | 9/1971 | Laird | 277/53 |
| 3,694,882 | 10/1972 | Desmond | 29/156.8 R |
| 3,829,233 | 8/1974 | Scalzo et al. | 415/136 |
| 3,880,435 | 4/1975 | Thornbald | 277/53 |
| 3,941,500 | 3/1976 | Glenn | 415/136 |
| 3,990,807 | 11/1976 | Sifford | 415/136 |
| 4,087,199 | 5/1978 | Hemsworth et al. | 415/174 |
| 4,177,004 | 12/1979 | Riedmiller et al. | 415/116 |
| 4,239,451 | 12/1980 | Bouru | 415/170 R |
| 4,247,248 | 1/1981 | Chaplin et al. | 415/136 |
| 4,251,185 | 2/1981 | Karstensen | 415/136 |
| 4,295,785 | 10/1981 | Lardellier | 415/174 |
| 4,354,687 | 10/1982 | Holland et al. | 277/26 |
| 4,449,714 | 5/1984 | Meier | 277/9 |
| 4,507,052 | 3/1985 | Thompson | 415/172 A |
| 4,645,424 | 2/1987 | Peters | 415/172 A |
| 4,655,683 | 4/1987 | Chaplin | 415/174 |

Primary Examiner—Robert E. Garrett
Assistant Examiner—John T. Kwon
Attorney, Agent, or Firm—Francis L. Conte; Derek P. Lawrence

[57] ABSTRACT

A seal assembly for reducing fluid leakage around a circumferential periphery of an annular nozzle stage in a gas turbine engine includes an abradable annular steel member having an annular attachment ring attached to an outer surface, the ring including a radially extending flange portion. The side of the seal member opposite the attachment ring forms a conventional labyrinth seal with a rotating member extending from a turbine wheel. The nozzle stage includes an annular portion extending inward towards the seal member and having an axially facing area for abutting the attachment ring. The member depending from the nozzle stage in conjunction with the attachment ring forms a radially slidable seal. Tabs are provided attached to one side of the seal member for engaging the depending member from the nozzle stage for holding the seal member in sliding contact against the nozzle stage. The radial sliding relationship between the seal assembly and the nozzle stage permits differential radial movement between the attachment ring and the nozzle stage to thereby maintain the sealing relationship under differential operating temperatures.

22 Claims, 3 Drawing Sheets

SEAL ASSEMBLY

The Government has rights in this invention pursuant to Contract No. DAAK51-83-C-0014 awarded by the Department of the Army.

The present invention relates generally to gas seals in gas-turbine engines, and, more particularly, to removable annular seals for turbine nozzles.

BACKGROUND OF THE INVENTION

Gas turbine engines typically include a fan section, a compressor section, a combustion section, and a turbine section in serial flow relationship. Air drawn in by the fan section is compressed or pressurized in the compressor section before being heated in the combustion section to produce a high velocity gas stream. Energy is extracted from the gas stream in the turbine section by being utilized to cause rotation of a plurality of rotor stages. Each rotor stage comprises an annular array of rotor blades and receives combustion gases from an upstream adjacent annular array of nozzle vanes. The rotor blades are secured to a rotor disk which rotates as the gas stream passes over the rotor blades. The nozzle vanes are stationary and turn the gas stream in a desired direction over the rotor blades.

The temperature of the gas stream as it exits the combustion section may be as high as, for example, 2000 degrees Fahrenheit (or 1093 degrees Centigrade). This stream of hot gases may attain a velocity, for example, in excess of 2000 feet per second (or 610 meters per second) as it passes through the nozzle vanes. The nozzle vanes are suitably attached to an inner band or platform and an outer band or shroud, such as, for example, by welding or being integrally cast therewith to form an annular array of vanes commonly referred to as a turbine nozzle. Since the turbine nozzle directs the gas stream in predetermined directions for efficient operation of the engine, it is desirable to assure that all of the gas stream passes through the vanes of the nozzle by reducing leakage around the platform and shroud ends of the nozzle.

It is known in the art to provide seals to prevent gas leakage in gas turbine engines. U.S. Pat. No. 3,423,070 issued Jan. 21, 1969 and assigned to the assignee of the present invention describes one form of seal, i.e., a honeycomb seal. One disadvantage with prior art seal arrangements has been the difficulty of replacing seals during engine servicing. For example, seals have been brazed or welded to the nozzle bands. A further disadvantage arises from other forms of attachment by either rivets or pins which may be required to permit radial shifting of the seal. Such radial shifting is utilized to compensate for differential thermal expansion and contraction in the turbine section. When rivets and pins are used, the support structure for the seal is relatively heavy and costly and decreases the fuel efficiency of the engine. Another disadvantage of the prior art seal arrangements has been the requirement for special tooling for installing and handling pins and/or rivets.

SUMMARY OF THE INVENTION

Accordingly, it is an object of the present invention to provide a new and improved seal arrangement.

Another object of the present invention is to provide a seal assembly for a gas turbine engine nozzle which accommodates differential thermal expansion and contraction.

Another object of the present invention is to provide a seal assembly for a gas turbine engine which is easily removable and replaceable.

Another object of the present invention is to provide a seal assembly for a gas turbine engine which is lightweight, relatively low cost and removable and replaceable without special tooling.

In an illustrative embodiment, the present invention comprises a unitary annular seal structure for attachment to a turbine nozzle in a gas turbine engine. The nozzle includes an annular platform disposed circumferentially about a longitudinal axis of the engine. An annular array of vanes is secured to the platform. The seal structure includes an abradable annular seal member, a seal backing member and a seal attachment ring. The attachment ring includes an annular, radially extending, axially acting spring member positioned to cooperate with a plurality of radially extending tabs on the backing member. In use, the seal structure is positioned within a circular opening within the turbine nozzle. The nozzle includes a radially depending appendage formed as part of the nozzle platform. The spring member abuts one side of the appendage and the tabs are positioned to abut another side of the appendage for holding the annular spring member in gas sealing engagement with the appendage to thereby provide a seal against gas leakage and to axially restrain the seal structure. The spring member and tabs comprise a radially slideable joint for the seal structure. In order to restrict circumferential motion of the seal structure, slots are formed in the appendage for receiving the tabs. Seal replacement is easily achieved by bending the tabs and sliding the seal structure axially out of the nozzle. Differential thermal expansion and contraction are accommodated by the radially slideable seal arrangement. A primary gas seal is maintained by circumferential sliding contact between the abradable seal member and an annular knife edge attached to a turbine disk.

BRIEF DESCRIPTION OF THE DRAWINGS

The novel features believed characteristic of the invention are set forth in the appended claims. The invention, in accordance with an exemplary preferred embodiment, together with further objects and advantages thereof is more particularly described in the following detailed description taken in conjunction with the accompanying drawings in which:

The exemplary features set out herein illustrate preferred embodiments of the present invention, and are not to be construed as limiting either the scope of the invention or the scope of the disclosure thereof in any manner.

DETAILED DESCRIPTION

Figure 1:
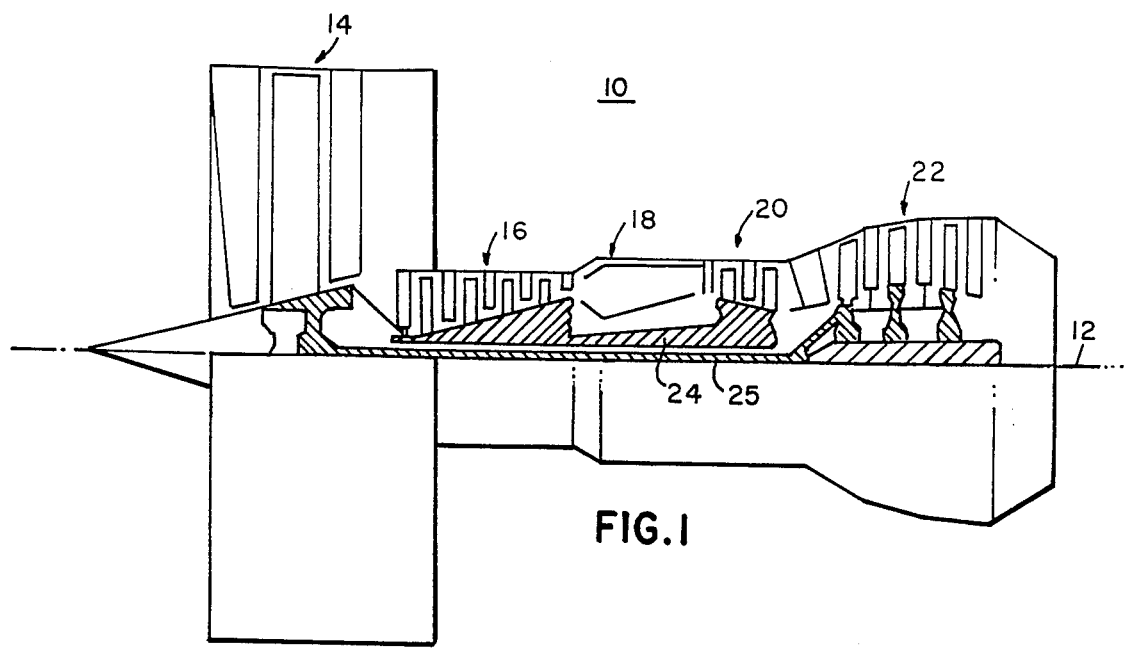
FIG. 1 is a schematic side elevation view, in partial section, of a gas-turbine engine with which the present invention may be used.

FIG. 1 is a partial cutaway view of a highly simplified schematic illustration of an exemplary gas turbine engine 10. The engine 10 is a high-bypass turbo-fan engine arranged substantially concentrically about a longitudinal or axial axis, depicted by the dashed line 12. The engine 10 includes a fan section 14, a compressor section 16, a combustion section 18, a high pressure turbine section 20, and a low pressure turbine section 22 all being, but for the present invention, conventional. Air pulled in by the fan section 14 is compressed in the compressor section 16 and then flows into the combustion section 18 where it is mixed with fuel and ignited to produce a high energy (high temperature and high pressure) gas stream. The gas stream flows across a plurality of blades in each rotor stage of the high pressure turbine section 20 and the low pressure turbine section 22, causing rotation of the rotor stages. The high pressure turbine section 20 rotates the compressor section 16 through a shaft 24. The low pressure turbine section 22 rotates the fan section 14 and other components through a rotor shaft 25. Although a turbo-fan engine is shown in FIG. 1, it is to be understood that the invention thereinafter described can be effectively employed on other types of gas turbine engines.

Figure 2:
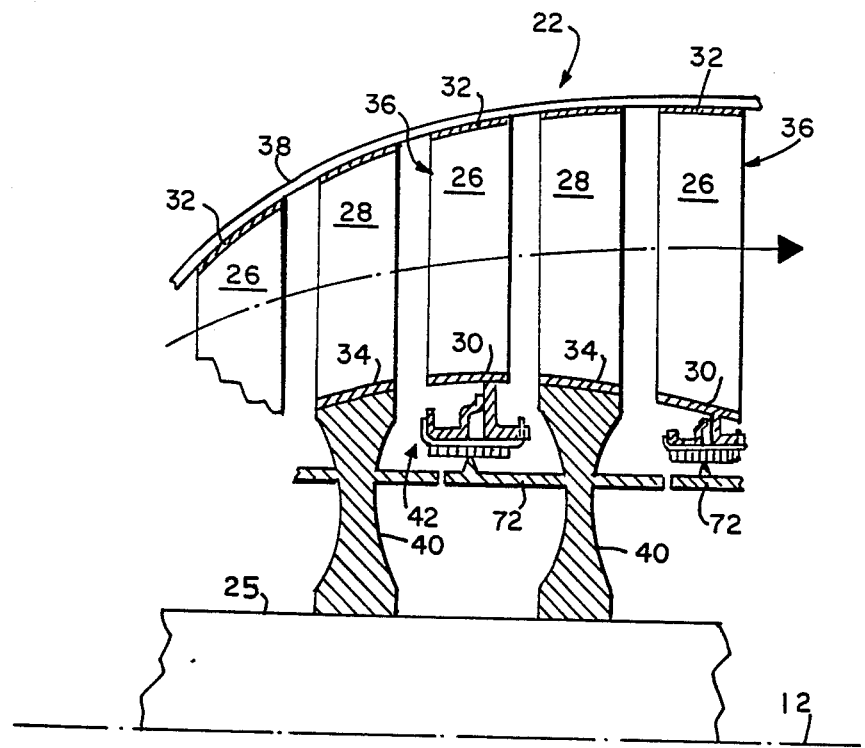
FIG. 2 is an enlarged partial schematic view of a turbine section of the engine of FIG. 1 incorporating one embodiment of the present invention.

Referring to FIG. 2, there is shown a portion of the low pressure turbine section 22 of the engine 10. The turbine section 22 includes alternating annular arrays of nozzle vanes 26 and rotor blades 28, the vanes 26 and blades 28 being designed as airfoils for reacting the hot gas stream. The nozzle vanes 26 are attached to a radially outer band 32 and a radially inner platform 30 to form non-rotating annular nozzle stages 36 (best seen in FIG. 3). The nozzle stages are suitably attached to and supported by an annular outer engine shroud 38. The nozzle vanes 26 are typically designed for two purposes: to increase the velocity of the heated gases flowing past them, and to direct the flow of gases to strike the rotor blades 28 at a desired angle. Each of the rotor blades 28 is typically attached at its radially inner end to a platform 34. Extending from the platform 34 is a conventional dovetail (not shown) which connects the blade 28 to a disk 40 which is attached to the rotor shaft 25. The assembled blades 28 and disk 40 form a turbine wheel.

The high velocity gas or fluid exists one of the nozzle stages 36 and strike an adjacent array of rotor blades 28 in a turbine wheel to effect its rotation and drive the shaft 25. As stated above, any leakage of fluid/gas around a circumferential periphery of one of the annular nozzle stages 36 contributes to inefficiency of the engine. Such inefficiency may arise from gas leakage around the platform 30 causing a reduction of net velocity of gas flow and increased turbulence. One major cause of gas leakage is differential thermal expansion between platform 30 and its adjacent seal or mating surface due to high temperature gases reacting on the nozzle vanes 26. Differential temperatures during engine operation results in expansion and contraction between the nozzle stages 36 and any adjacent mating surfaces. Thus, it is desirable to provide a sealing structure which accommodates movement from differential expansion and contraction yet also effectively seals against leakage during such movement.

Figure 3:
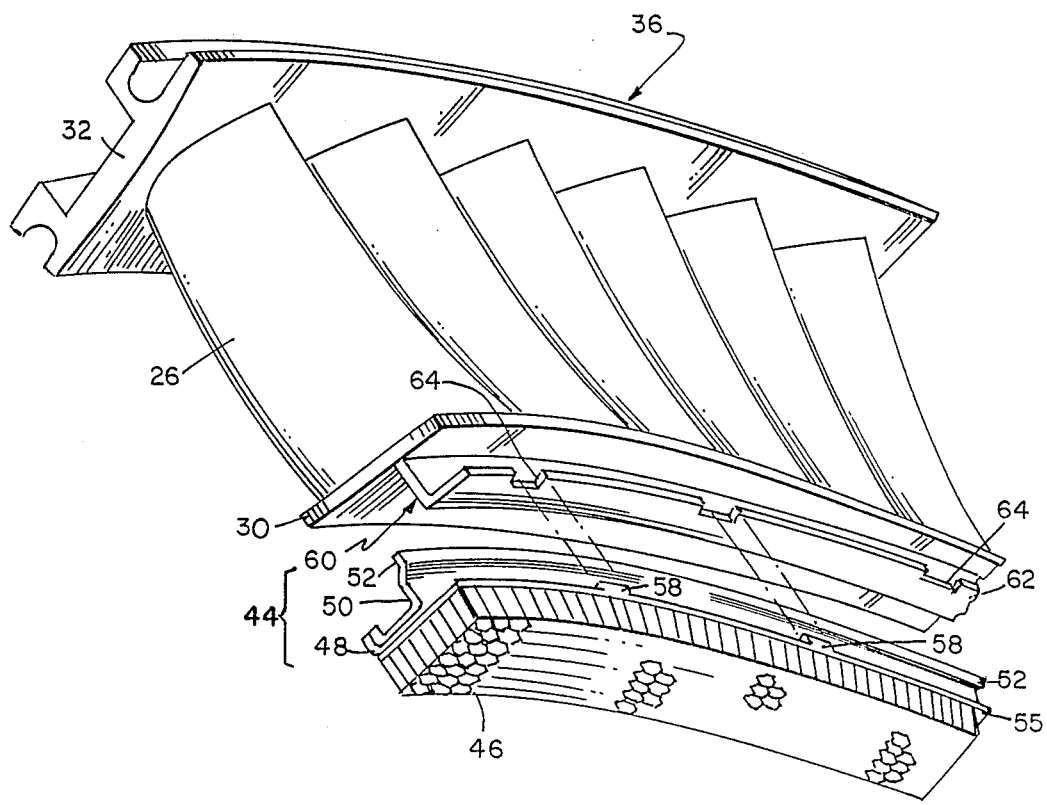
FIG. 3 is a perspective view of a section of a turbine nozzle and seal structure, separated for clarity, illustrating one embodiment of the present invention.
Figure 4:
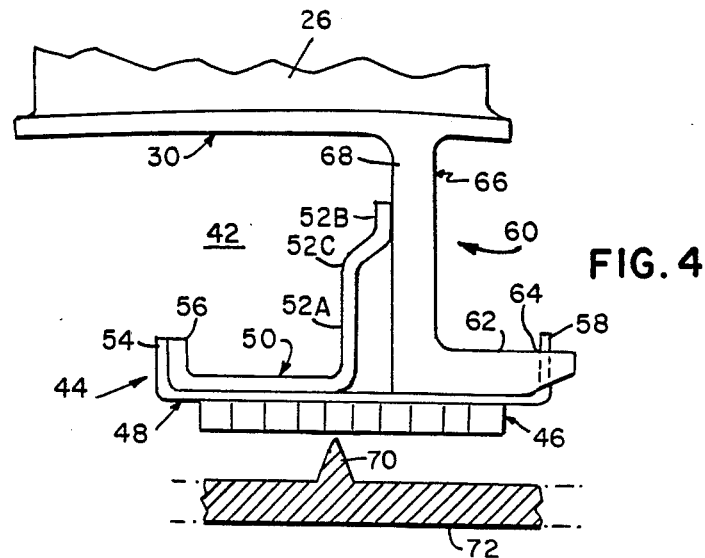
FIG. 4 is an enlarged partial cross-sectional view of a nozzle platform illustrating one form of the present invention seal in sealing relationship with the platform.
Figure 5:
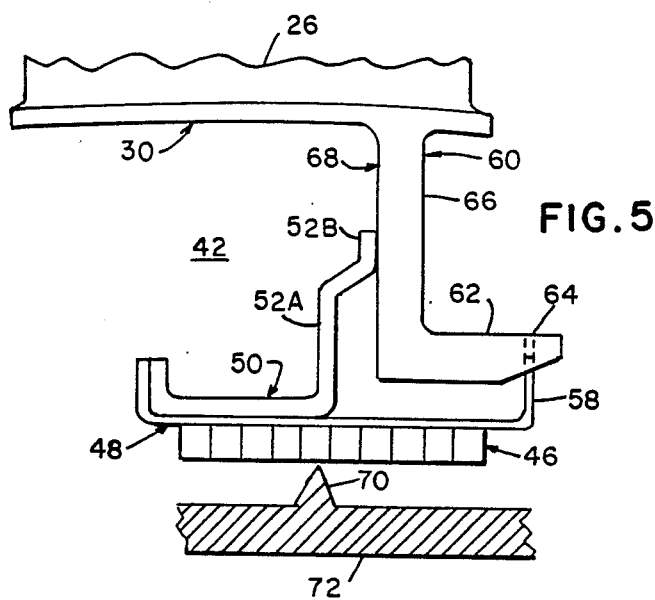
FIG. 5 is a view of the platform and seal arrangement of FIG. 4 in which the seal and platform have been displaced due to differential radial growth therebetween.

Reference is now made to FIGS. 3 through 5 in conjunction with FIG. 2 which illustrate a sealing structure 42 in accordance with one embodiment of the present invention for reducing gas leakage around a nozzle stage. The structure 42 is shown in greater detail in FIGS. 4–5. The hot gases passing through the turbine section 22 heat the various components, such as the airfoils 26 and 28, the bands 32, the platforms 30 and 34 and the disks 40 and cause them to thermally expand. Since the components may be made of diverse materials, may have diverse material thicknesses, and may be subject to diverse rates of heating, each component may expand differently. Accordingly, the sealing structure 42 is adapted to accommodate differential expansion in a radial direction and similar contraction as components cool.

The sealing structure seal assembly 42 comprises a seal assembly 44 which includes a conventional abradable annular seal member 46 having a radially outer circumferential surface fixedly attached to a first circumferential, radially inner surface of an annular seal backing ring 48 by brazing, welding or other suitable means well known in the art. The member 46 may be a "honeycomb" type seal well known in the art. An attachment ring 50 is suitably attached, for example by brazing or welding, to a second circumferential, radially outer surface of the backing ring 48, i.e., the surface opposite the surface to which the seal 46 is attached. In accordance with one embodiment of the invention the attachment ring 50 is a generally annular U-shaped ring having axially spaced first and second annular legs 52 and 56, respectively, extending radially outwardly of the ring 48. The backing ring 48 can be seen to have an essentially L-shaped structure with a first up-turned edge 54 against which the second leg 56 of attachment ring 50 is positioned. A remaining or second edge 55 of ring 48 includes a plurality of circumferentially spaced tabs 58, which are up-turned in the installed position (best seen in FIG. 3).

Considering specifically FIG. 3, a portion of an annular nozzle stage 36 is illustrated perspectively and partially exploded for clarity. This figure shows some of the structural aspects of the outer band 32 which provides physical support and enables attachment to the shroud 38 (see FIG. 2) of turbine section 22. In accordance with one embodiment of the invention, a radially inner surface of platform 30 (the circumferential periphery of nozzle stage 36) is formed with a generally L-shaped radially inwardly extending annular support member 60. The member 60 includes a first leg 66 suitably attached to (by brazing, welding or integral casting) and extending radially inwardly from a radially inner surface of the platform 30. A second axially extending leg 62 of the L-shaped support member 60 extends generally parallel to the longitudinal axis 12 from the first leg 66 and has a plurality of circumferentially spaced slots 64 formed in an axially facing edge surface for receiving the tabs 58 radially extending from backing ring 48.

A significant element of the present invention is the first leg 52 of attachment ring 50 illustrated in FIG. 4 in accordance with one embodiment. Although the first leg 52 may be a straight member, it preferably has a radially outwardly extending straight distal end portion 52B being integral therewith through an inclined intermediate portion 52C. The first leg 52 is sized for and formed of a suitable high temperature, spring metal material, for example, commercially available Hast-X, to provide elastic resiliency in the axial direction for enabling spring action. During assembly, an axially facing surface of the first leg 52 is pressed against and abuts a lateral (axially facing) surface 68 of support member 60 to effect an initial axial preload to effect an annular fluid seal thereagainst. In the preferred embodiment only distal end 52B provides a seal against the surface 68 with portions 52A and 52C providing an offset.

The tabs 58 on backing ring 48 are bent during assembly from an initial axial position to a radial position to fit into the slots 64 and provide a retaining force against the spring action of first leg 52. It will be noted that the spring leg 52 is formed with the reverse curve portion 52B to establish a limited sliding contact surface and also to enhance the spring action of leg 52. The tabs 58 cooperate with the slots 64 to constrain circumferential rotation of seal assembly 44 while permitting differential radial expansion and contraction between the seal assembly 44 and platform 30. In particular, the tabs 58 are free to move radially in the slots 64, and the first leg 52 is free to slide radially in sealing contact with and against the lateral surface 68 of the first leg 60.

The use of honeycomb seals is well known in the aircraft engine art for providing a sealing relationship between rotating and non-rotating elements. However, for purposes of clearly explaining the invention, as shown in FIGS. 2 and 4, a radially inner circumferential surface of the seal member 46 is closely positioned adjacent to one or more "knife" or labyrinth edges 70 in conventional sealing relationship therewith. The edges 70 are carried by cantilevered arms 72 axially extending from rotatable turbine disks 40. Since the primary gas flow path is through nozzle vanes 26 and rotor blades 28, the portions of the nozzle stages and turbine wheels in the flow path are hotter than those portions, including in particular the seal assembly 44, out of the flow path. Consequently, there is differential radial expansion and contraction between and within the nozzle stages 36 and the turbine wheels. If the sealing structure does not compensate for such differential thermal movement, a gap may be created or enlarged between edges 70 and an adjacent seal member 46 which will allow gases to bypass the turbine nozzles and reduce the efficiency of the engine. In general, the seal between member 46 and edges 70 is referred to as a primary seal while the seal between ring 50 and platform 30 is referred to as a secondary seal.

Referring to FIG. 5, there is shown a significant advantage of the present invention in accommodating differential radial movement within a gas turbine engine adjacent the turbine nozzle stage 36. The seal assembly 44 comprising the seal member 46, backing ring 48 and attachment ring 50 remains in sealing relationship with the knife edge 70 while the nozzle stage 36 has expanded radially. The sliding spring contact relationship between attachment ring 50 and the depending leg 66 of platform support member 60 allows the gas stream to be confined to its normal flow path by virtue of the sealing contact between spring leg portion 52B and the surface 68 of platform leg portion 66. The length of the tabs 58 is sufficiently long to permit radial movement without losing contact between tabs 58 and leg 62 of support member 60.

It will be appreciated by those skilled in the art that the present invention allows the seal assembly 44 to freely move in a radial direction with respect to the vanes 26 and the platform 30. Inasmuch as the vanes 26 are directly subjected to hot gases they will expand radially outwardly more than the seal assembly 44 which will be at a lower temperature. FIG. 5 illustrates a position of the nozzle platform 30 due to thermal expansion as contrasted with the reference position, illustrated in FIG. 4. Inasmuch as the seal assembly 44 and the edge 70 and associated arm 72 are located away from the primary hot gas flow, they expand/contract relatively little with respect to each other for maintaining enhanced sealing at the edge 70.

Expansion or contraction within engine 10 in an axial direction is also accommodated by the inventive sealing structure. However, for axial movement, each seal member 46 remains in its normal relative position with respect to a corresponding turbine nozzle stage 36. The member 46 is provided with sufficient width in the axial direction to allow axial displacement of knife edge 70 without its losing contact with member 46. Thus, the seal assembly 44 allows axial displacement between a turbine nozzle stage 36 and the seal member 46 without loss of seal effectiveness.

The seal backing member 48 is preferably formed of a light weight sheet metal material. Prior to attachment to the turbine nozzle, the tabs 58 are parallel to a central axis of the annular seal assembly 44 which may be the centerline 12, for example. When the seal structure 44 is first axially positioned within a turbine nozzle stage 36, the tabs 58 are bent from an initial axial position generally parallel to the surface of ring 48 to a radially outwardly position as shown in FIGS. 3-5 and serve to hold the seal assembly in place against axial and circumferential movement within the turbine nozzle stage 36. Whenever the engine 10 is disassembled for servicing, the seal assembly 44 is easily detached from the turbine nozzle stage by simply bending the tabs 58 to their initial axially oriented position and axially pulling the assembly 44 out of the nozzle stage. Replacement requires only a simple positioning of a new seal assembly 44 within the nozzle stage and bending of tabs 58 for its restraint. In this manner, a seal can be easily removed and replaced.

While there have been described herein what are considered to be preferred embodiments of the invention, other modifications will occur to those skilled in the art from the teachings herein, and it is, therefore, desired to secure in the appended claims all such modifications as fall within the true spirit and scope of the invention. For example, although the tabs 58 have been disclosed as attached to ring 48 and the slots 64 are disposed in the member 60, an opposite configuration is also possible.

Having thus described the invention, what is claimed as novel and desired to be secured by Letters Patent of the United States is:

1. In a gas turbine engine having an annular array of nozzle vanes secured to an annular platform disposed radially about a longitudinal axis of the engine, a seal assembly comprising:

an annular seal member;

an annular seal backing ring having a first radially inner circumferential surface fixedly secured to a radially outer surface of said seal member and a second radially outer circumferential surface facing a radially inner circumferential surface of the platform, said seal backing ring further including a plurality of circumferentially spaced tabs bendable between an initial axially aligned position and a radially extending position;

an L-shaped member fixedly attached to a radially inner surface of the annular platform, said L- shaped member having a radially depending first leg and an axially extending second leg;

a plurality of circumferentially spaced slots formed in said second leg of said L-shaped member, said slots being positioned for receiving said tabs when said tabs are in a radially extending position;

an attachment ring fixedly attached to said radially outer circumferential surface of said seal backing ring, said attachment ring having a radially outwardly extending portion adapted for abutting an axially facing surface of said first leg of said L-shaped member, said attachment ring being held against said facing surface by said tabs in said radially extending position, said abutting relationship between said attachment ring and said facing surface forming a gas seal.

2. The seal assembly of claim 1 wherein said attachment ring comprises:

a base portion attached to said surface of said backing ring and extending radially outward therefrom;

a distal end portion extending radially outward and axially displaced from said base portion; and an intermediate portion for coupling said distal end portion to said base portion, said distal end portion being in slidable contact with said facing surface of said first leg of said L-shaped member for establishing an annular gas seal.

3. The seal assembly of claim 1 wherein said backing ring comprises an annular ring having a radially outwardly extending flange portion formed circumferentially along a first edge thereof, said tabs being circumferentially spaced along a second edge thereof.

4. The seal assembly of claim 3 wherein:

said seal backing ring is formed of sheet metal; and said tabs are capable of being bent into engagement with and out of engagement with said slots whereby said seal assembly may be easily assembled to and disassembled from said platform.

5. A seal assembly for reducing fluid leakage around a circumferential periphery of an annular nozzle stage in a turbine comprising:

an abradable annular seal member having radially inner and outer surfaces, one of said surfaces being positionable adjacent to a rotating member and providing a seal therebetween;

an annular attachment ring fixedly attached to the other of said surfaces of said seal member opposite the rotating member, said ring including a radially extending annular portion;

a radially extending annular member fixedly attached to the circumferential periphery of the nozzle stage, said annular member having a surface for axially abutting said portion of said ring for establishing a sealing relationship therebetween; and radially slidable releasable coupling means for holding said ring portion in sealing relationship with said surface of said member extending from the nozzle stage while permitting differential radial movement between said attachment ring and said nozzle stage, said coupling means comprising a plurality of circumferentially spaced, radially extending tabs fixedly connected to said ring and a plurality of axially extending slots formed in said annular member, respective ones of said tabs being positionable in respective ones of said slots.

6. The seal assembly of claim 5 wherein said abradable seal member comprises a honeycomb seal.

7. The seal assembly of claim 5 and including a backing ring attached to said other surface of said seal member, said attachment ring being attached to said backing ring.

8. The seal assembly of claim 7 wherein said plurality of circumferentially spaced tabs is formed along a first edge of said backing ring, said tabs being bendable between an initial axial position and a final radially oriented position for axially holding said attachment ring against said nozzle stage member.

9. The seal assembly of claim 8 wherein said backing ring includes a radially extending circumferential flange along a second edge thereof.

10. The seal assembly of claim 8 wherein said nozzle stage member comprises an L-shaped member having a radially extending portion and an axially extending portion, said radially extending portion having a first circumferential edge attached to the nozzle stage and a second circumferential edge attached to said axially extending portion, an edge of said axially extending portion distal from said radially extending portion being provided with a plurality of circumferentially spaced slots for receiving said tabs in said final position, one side of said radially extending portion forming a facing surface for abutting said attachment ring in sealing relationship.

11. The seal assembly of claim 10 wherein said attachment ring comprises:

a base portion attached to said surface of said backing ring and extending radially outward therefrom;

a distal end portion extending radially outward and axially displaced from said base portion; and an intermediate portion for coupling said distal end portion to said base portion, said distal end portion being in slidable contact with said facing surface of said first leg of said L-shaped member for establishing an annular gas seal.

12. In a gas turbine engine having an annular array of nozzle vanes secured to an annular platform disposed radially about a longitudinal axis of the engine, a seal assembly comprising:

an annular seal member;

a seal backing ring having a first circumferential surface fixedly secured to said seal and a second circumferential surface facing a circumferential surface of said platform, one of said seal backing ring and said platform including a plurality of tabs, each tab being positioned in a respective one of a plurality of slots within the other of said seal backing ring and said platform, said tabs and said slots axially and circumferentially constraining said seal assembly with respect to said platform; and an attachment ring slidably coupling said seal backing ring to said platform, said attachment ring exerting an axially directed spring force between said seal backing ring and said platform, said tabs cooperating with said slots for maintaining said axial force to effect a seal between said platform and said attachment ring.

13. The seal assembly of claim 12 wherein said tabs extend radially into said slots for permitting differential radial movement of said seal assembly and said platform.

14. The seal assembly of claim 13 wherein the platform includes a radially extending portion having an axially facing surface, said attachment ring including a radially extending annular spring member positioned for slidably abutting said facing surface for establishing a seal therebetween.

15. The seal assembly of claim 14 wherein said attachment ring comprises:
   a base portion attached to said surface of said backing ring and extending radially outward therefrom;
   a distal end portion extending radially outward and axially displaced from said base portion; and
   an intermediate portion for coupling said distal end portion to said base portion, said distal end portion being in slidable contact with said facing surface of said first leg of said L-shaped member for establishing an annular gas seal.

16. The seal assembly of claim 14 wherein the engine includes a rotating turbine disk, the disk having an axially extending annular support member and a radially extending annular knife edge attached to said support member, said annular seal member being positioned adjacent to the knife edge for forming a primary seal between the nozzle vane platform and the turbine disk.

17. A gas turbine engine turbine section comprising:
   a turbine nozzle having a plurality of vanes attached to an annular platform;
   a turbine wheel having a plurality of blades attached to a disk;
   a seal assembly between said nozzle platform and said turbine disk for inhibiting leakage of gases around said platform and through said turbine blades, said assembly comprising an annular seal member operatively connected to an annular support member extending from said platform; and
   means for maintaining sealing of said seal assembly under differential thermal movements of said turbine nozzle and seal assembly, said means comprising an attachment ring connected to said seal member and disposed in sealing contact with said annular member, a plurality of circumferentially spaced, radially extending tabs fixedly connected to said ring, and a plurality of axially extending slots formed in said annular support member, respective ones of said tabs being positionable in respective ones of said slots.

18. A gas turbine engine turbine section according to claim 17 wherein:
   said seal assembly further comprises a stationary backing ring and said annular seal member is fixedly connected thereto, and an annular knife edge adjacent to said seal member and attached to a cantilever arm extending from said turbine disk; and
   said attachment ring extends from said backing ring, said support member and said attachment ring being in sliding sealing contact with each other for accommodating differential thermal movements between said turbine nozzle platform and said backing ring.

19. A gas turbine engine turbine section according to claim 18 wherein said plurality of circumferentially spaced tabs extends from said backing ring and said tabs are positioned in said slots to prevent circumferential movement.

20. A gas turbine engine turbine section according to claim 19 wherein said support member is generally L-shaped having a first leg extending from said platform and a second leg extending perpendicularly from said first leg, said second leg including said slots and said attachment ring being positioned in sliding contact against said first leg.

21. For a gas turbine engine turbine section having a turbine nozzle including a plurality of vanes attached to an annular platform, and having blades attached to a disk, a seal assembly positioned between said nozzle platform and said turbine disk for inhibiting leakage of gases around said platform and through said turbine blades comprising:
   a stationary backing ring and an annular seal member fixedly connected thereto;
   an annular knife edge adjacent to said seal member in sealing cooperation therewith, said knife edge being attached to a cantilever arm extending from said turbine disk; and
   means for maintaining sealing of said seal member and knife edge under differential thermal movements of said turbine nozzle and said backing ring comprising:
      an annular support member extending from said nozzle platform;
      an attachment ring extending from said backing ring;
      said support member and said attachment ring being in sliding sealing contact with each other for accommodating said differential thermal movements; and
      said sealing maintaining means further including a plurality of circumferentially spaced slots in said support member and a plurality of circumferentially spaced tabs extending from said backing ring, said tabs being positioned in said slots to prevent circumferential movement.

22. A gas turbine engine turbine section according to claim 21 wherein said support member is generally L-shaped having a first leg extending from said platform and a second leg extending perpendicularly from said first leg, said second leg including said slots and said attachment ring being positioned in sliding contact against said first leg.

* * * * *